(12) United States Patent
Harris et al.

(10) Patent No.: US 8,799,569 B2
(45) Date of Patent: Aug. 5, 2014

(54) MULTIPLE ENHANCED CATALOG SHARING (ECS) CACHE STRUCTURE FOR SHARING CATALOGS IN A MULTIPROCESSOR SYSTEM

(75) Inventors: Eric J. Harris, Tucson, AZ (US); Franklin Emmert McCune, Tucson, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 13/448,884

(22) Filed: Apr. 17, 2012

(65) Prior Publication Data

US 2013/0275670 A1   Oct. 17, 2013

(51) Int. Cl.
*G06F 15/80* (2006.01)

(52) U.S. Cl.
USPC .......................................... 711/113; 711/119

(58) Field of Classification Search
CPC ................ G06F 9/3891; G06F 17/218; G06F 2212/7207
See application file for complete search history.

(56) References Cited

U.S. PATENT DOCUMENTS

| | | | | |
|---|---|---|---|---|
| 5,537,574 A | * | 7/1996 | Elko et al. | 711/141 |
| 5,813,032 A | * | 9/1998 | Bhargava et al. | 711/130 |
| 5,848,241 A | * | 12/1998 | Misinai et al. | 709/213 |
| 6,438,654 B1 | * | 8/2002 | Elko et al. | 711/133 |
| 6,675,175 B2 | | 1/2004 | Branch et al. | |
| 2002/0023070 A1 | * | 2/2002 | Branch et al. | 707/1 |
| 2005/0198411 A1 | * | 9/2005 | Bakke et al. | 710/22 |
| 2010/0185697 A1 | | 7/2010 | Lehr et al. | |
| 2013/0060796 A1 | * | 3/2013 | Gilg et al. | 707/756 |

OTHER PUBLICATIONS

Jon Tate et al., "Enhanced Catalog Sharing and Management," International Technical Support ORganization, www.redbooks.ibm.com, IBM Corporation, San Jose, California, pp. 1-132.

* cited by examiner

*Primary Examiner* — Matthew Bradley
*Assistant Examiner* — Candice Rankin
(74) *Attorney, Agent, or Firm* — Eric A. Gifford (57) ABSTRACT

Various method and system embodiments for facilitating catalog sharing in multiprocessor systems use multiple ECS cache structures to which catalogs are assigned based on an attribute such as SMS storage class or a high level qualifier (HLQ) (e.g. an N-to-1 mapping) or each individual catalog (e.g. a 1-to-1 mapping). When maintenance is performed on an ECS shared catalog, the multiple ECS cache structure requires only those catalogs associated with a particular ECS cache structure be disconnected. Any catalogs in the structure that are not involved in or affected by the maintenance may be temporarily or permanently moved to a different ECS cache structure. As a result, VVDS sharing is only required for those catalogs on which maintenance is being performed or that remain associated with that ECS cache structure during maintenance. This reduces I/O activity to the DASD, and results in a significant overall performance improvement.

20 Claims, 8 Drawing Sheets

MULTIPLE ENHANCED CATALOG SHARING (ECS) CACHE STRUCTURE FOR SHARING CATALOGS IN A MULTIPROCESSOR SYSTEM

BACKGROUND

1. Field of the Invention

The present invention relates generally to catalogs in shared-storage multiprocessor systems and more particularly to the sharing of catalogs in such a system.

2. Description of the Related Art

In today's information technology industry, customers desire systems that have better performance and cost improvements over their current systems, while permitting continued use of their existing applications. High availability is also important given today's rising mobile workforce and ability for global connectivity through the Internet. Current processing system designs for information technology applications must provide scalable, granular growth, and continuous application availability. Clustering technology, such as IBM Corporation's z/OS Sysplex, has been developed to achieve these design needs.

A cluster arrangement links individual data processing systems in a manner that creates a single, powerful system, which can support numerous users simultaneously. A cluster offers high availability and excellent scalability. If one system/node in the cluster fails, the other systems in the cluster continue to run.

In such a multiprocessor system, catalogs typically are used to categorize data. Typically, in cluster arrangements such as IBM's z/OS, an integrated catalog facility (ICF) structure is utilized to support shared catalogs. A catalog is a data set that contains information about other data sets. It provides users with the ability to locate a data set by name, without knowing where the data set resides. By cataloging data sets, users will need to know less about the storage setup. Thus, data can be moved from one device to another, without requiring a change in statements that refer to an existing data set.

Cataloging data sets simplifies backup and recovery procedures. Catalogs are the central information point for Virtual Storage Access Method (VSAM) data sets: all VSAM data sets must be cataloged. In addition, all System Managed Storage (SMS) managed data sets must be cataloged.

In conventional systems, an Integrated Catalog Facility (ICF) Catalog component supports shared catalogs by maintaining a local system cache of recently accessed catalog records in main memory on each system and a list of catalog updates in what is called a "sharing subcell" in the data VSAM Volume Record (VVR) contained in the VSAM Volume Data Set (VVDS) on a direct access storage device (DASD) memory subsystem. Whenever a request is made to a shared catalog, the Catalog component must read the sharing subcell from the DASD memory subsystem, to verify the currency of the locally cached records on that system. This is referred to as "VVDS sharing".

The local DASD subsystem is updated from the change information contained in the sharing subcell. If a catalog request involves a modification to the catalog, this information is written to the sharing subcell on the DASD subsystem. Significant overhead in terms of cross-system communication and long-duration I/O activity occurs for each such catalog request. Field experience indicates the elapsed time to process a request against a shared catalog can be up to five times longer than the same request against an unshared catalog.

In order for a system to access this data, the disk must be locked out from all other systems while the I/O operation executes. This approach is time-consuming and also makes the disk unavailable to other systems for relatively long periods of time.

Enhanced Catalog Sharing (ECS), which is implemented in IBM's z/OS, addresses these limitations by utilizing a Coupling Facility processor for storing an entire data volume record. The processor contains control information for catalogs being shared among host systems. The processor also allows for cross-notification between systems when changes occur to the catalog control information. In so doing the host computers can access the processor directly rather than having to obtain the information from a DASD memory subsystem. Accessing processor memory (e.g. RAM) is faster than I/O activity on a hard disk such as the DASD memory subsystem.

ECS uses a Coupling Facility cache structure to contain the integrity VVR of each active shared catalog. Each system's Catalog function includes an ECS function that connects each catalog the ECS cache structure in the Coupling Facility. This shifts storage of the VVR from DASD to cache in the Coupling Facility, which greatly reduces I/O to DASD. This results in a significant performance improvement.

Each local system still reads data directly from DASD when the catalog updates indicate that the locally cached records are no longer current. Furthermore each local system writes data to DASD when the local system makes a change to the data, and causes a catalog update to be recording in the sharing subcell. The drastic reduction in I/O activity to DASD is attributable to eliminating VVDS sharing during normal operations. The local system Catalog component no longer reads the sharing subcell from the DASD memory subsystem to verify the currency of the locally cached records on that system every time the system needs to access its locally cached records and no longer writes catalog updates to the sharing subcell on DASD each time an update occurs. The coupling facility will from time-to-time update the sharing subcell on DASD when maintenance or a system reset occurs.

If maintenance of a catalog is required, either regularly scheduled maintenance or do to an error, the systems' ECS functions disconnect all of the catalogs from the ECS cache structure and the local systems revert to using VVDS sharing for all catalog updates. The Catalog component on each system then purges all local cache for each catalog that was previously in ECS. Once maintenance is completed, the systems' ECS functions reconnect the catalogs to rebuild the ECS cache structure. Once rebuilt, VVDS sharing is suspended and the cluster resumes ECS.

SUMMARY

To achieve greater storage performance and reliability for customers, a variety of improvements to multiprocessor shared-storage environments continue to be made. In particular improvements to ECS are made to further reduce I/O activity on DASD.

According to an embodiment of the present invention, a system and method for sharing a plurality of catalogs of different data sets a multiprocessor system comprises a plurality of host systems that support an enhanced catalog sharing (ECS) function of a Catalog component, a plurality of direct access storage device (DASD) subsystems and a coupling facility having cache structures reserved for ECS. The host systems' Catalog component uses its ECS function to connect to a plurality of ECS cache structures in the coupling facility and assign at least one catalog to each of the multiple ECS cache structures. The ECS cache structures may be defined and the catalogs assigned based on a common attribute such as a catalog's SMS storage class or a high level qualifier (HLQ) or each individual catalog.

A copy of the entire data volume record for each catalog, which is shared by the host systems, is stored in the assigned ECS cache structure. The data volume record includes catalog updates that are updated responsive to a shared catalog request from a requesting host system. Catalogs are read directed from the data volume record and returned to the requesting host system when the requesting host system needs access to the catalog. In an embodiment the data volume records comprises a virtual storage access method (VSAM) volume record (VVR).

To perform maintenance on a particular catalog, the ECS functions for the host systems are disconnected from only the ECS cache structure that stores the data volume record of the particular catalog. Prior to disconnecting, catalogs not involved in or affected by the maintenance may be moved to another ECS cache structure either temporarily or permanently. While disconnected, the systems default to using VVDS sharing to read catalog updates for only those catalogs still associated with the ECS cache structure directly from DASD. The systems continue to use ECS for all other shared catalogs associated with different ECS cache structures. Once maintenance is complete, the ECS functions are reconnected to rebuild the ECS cache structure for at least the particular catalog. Any catalogs that were moved to another ECS cache structure may be moved back.

Related system and computer program product embodiments are also disclosed.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

In view of foregoing, various method and system embodiments for facilitating catalog sharing in multiprocessor systems are provided. This is accomplished by using multiple ECS cache structures to which catalogs are assigned based on a common attribute such as SMS storage class or a high level qualifier (HLQ) (e.g. an N-to-1 mapping) or each individual catalog (e.g. a 1-to-1 mapping). There is no advantage to this multiple ECS cache structure during ordinary ECS. In fact, there is a small amount of additional overhead to access catalog updates in the assigned ECS cache structure. The advantage of this multiple ECS cache structure occurs when maintenance is performed on one or more of the shared catalogs. Instead of having to disconnect all of the catalogs from the ECS cache structure and default to VVDS sharing for all of the catalogs as is currently done, the multiple ECS cache structure requires only those catalogs associated with a particular ECS cache structure be disconnected. Furthermore, any catalogs in the structure that are not involved in or affected by the maintenance may be temporarily or permanently moved to a different ECS cache structure. As a result, VVDS sharing is only required for those catalogs on which maintenance is being performed or that remain associated with that ECS cache structure during maintenance. This further reduces I/O activity to the DASD, and results in a significant overall performance improvement.

Without loss of generality, the various methods and systems for facilitating overflow storage of special data sets that reside on a single logical volume will be described in the context of a storage hierarchy of a particular IBM mainframe storage system known as a "z/OS" volume. It will be understood to those of ordinary skill in the art that the methods and systems are applicable to other shared-storage multiprocessor systems that support ECS on a coupling facility.

Figure 1:
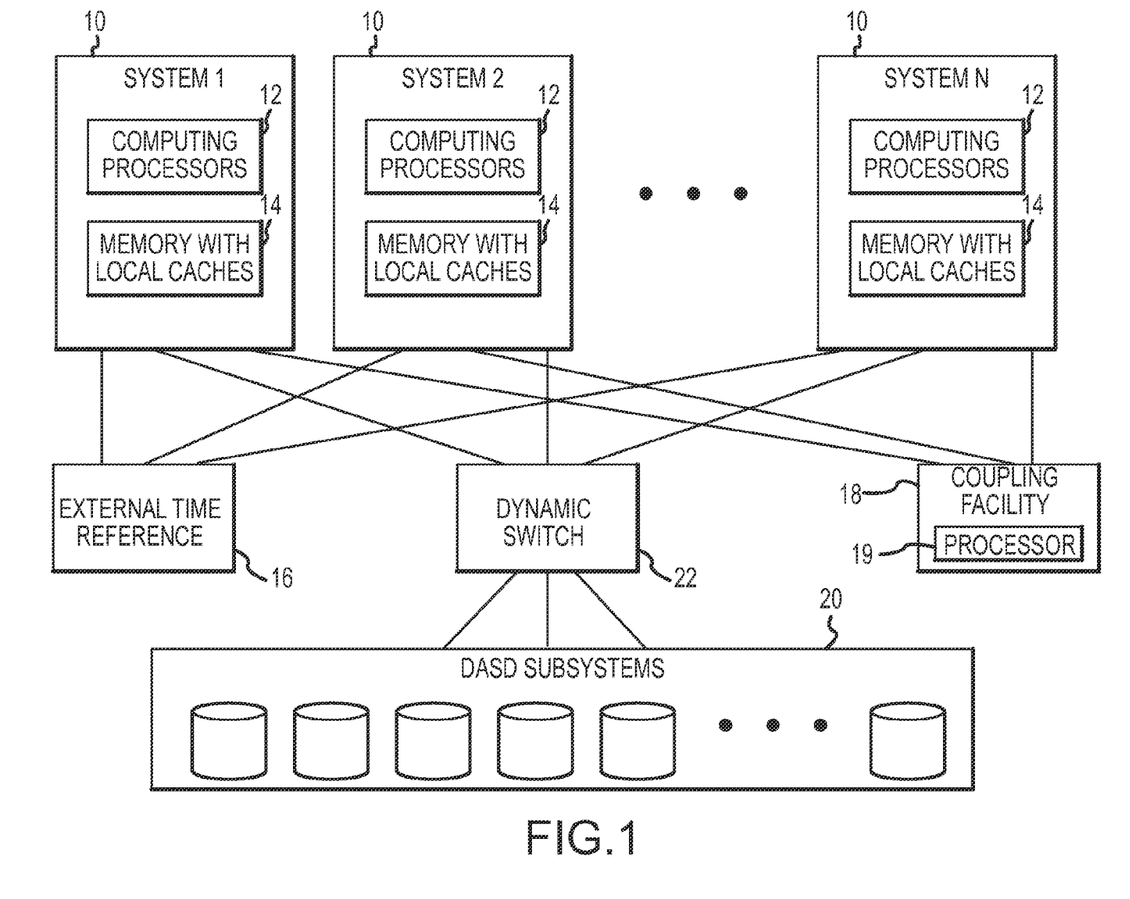
FIG. 1 illustrates a block diagram representation of an arrangement of multiple data processing systems.

To more fully understand the operation of the present invention in the context of a multiprocessing system, refer now to FIG. 1. FIG. 1 illustrates a cluster arrangement, e.g., a parallel sysplex system. Multiple host systems 10, e.g., System 1 to System N, are included in the sysplex, where each system 10 has one or more computing processors 12 and memory with local caches 14. By way of example, the z/OS Sysplex from IBM Corporation, Armonk, N.Y., is an example of a set of z/OS systems connected together by a clustering technology. An instance of the operating system, z/OS, runs on each system of the sysplex. Each of the systems access DASD (direct access storage device) 20 that is shared among the systems. The clustered system support enables large business applications to be spread across the multiple systems with dynamic workload balancing, which yields a wide range of application capacity scaling and extremely high application availability across planned and unplanned outage of individual systems. The load-balancing and availability features of parallel sysplex result in an application running on one system at one point in time and then run on another system at another point in time. To help facilitate the activity, the systems 10 are each coupled to an external time reference component 16 and a coupling facility 18 having a processor 19. Connections to DASD subsystems 20 are facilitated through a dynamic switch 22.

In such a multiprocessor system, catalogs typically are used to categorize data. Typically, in cluster arrangements such as IBM's z/OS, an ICF structure is utilized to support shared catalogs. A catalog is a data set that contains information about other data sets. It provides users with the ability to locate a data set by name, without knowing where the data set resides. By cataloging data sets, users will need to know less about the storage setup. Thus, data can be moved from one device to another, without requiring a change in statements that refer to an existing data set.

Typically a catalog is utilized to locate data sets in the multiprocessor system. An ICF catalog includes two separate kinds of data sets: a basic catalog structure (BCS); and a VSAM volume data set (VVDS). The BCS can be considered the catalog, whereas the VVDS can be considered an extension of the volume table of contents (VTOC).

The basic catalog structure is a VSAM key-sequenced data set. It uses the data set name of entries to store and retrieve data set information. For VSAM data sets, the BCS contains volume, security, ownership, and association information. For non-VSAM data sets, the BCS contains volume, ownership, and association information.

The VSAM volume data set is a VSAM entry-sequenced data set. A VVDS resides on every volume that contains a VSAM or a SMS managed data set cataloged in an ICF catalog. It contains the data set characteristics, extent information, and the volume-related information of the VSAM data sets cataloged in the BCS. If the SMS is utilized, the VVDS also contains data set characteristics and volume-related information for the SMS managed data sets on the volume.

The VTOC and the VTOC index are system data sets that maintain extent and allocation information for a volume. The VTOC is used to find empty space for new allocations and to locate non-VSAM data sets. For all VSAM data sets, and for SMS-managed non-VSAM data sets, the VTOC is used to obtain information not kept in the VVDS.

VVDS records for VSAM data sets are called "VSAM volume records" (VVRs). Those for SMS-managed non-VSAM data sets are called "non-VSAM volume records" (NVRs). If a non-VSAM data set spans volumes, its NVR is in the VVD of the data set's first volume. Since a BCS is a VSAM data set, it also has a VVR in the VVDS.

Every ICF catalog includes one BCS and one or more VVDSs. A BCS does not "own" a VVDS: more than one BCS can have entries for a single VVDS. Every VVDS that is connected to a BCS has an entry in the BCS.

The present invention provides for multiple enhanced catalog sharing (ECS) by utilizing a coupling facility processor for storing entire data volume records for different catalogs on different ECS cache structures in the coupling facility. Multiple catalogs may be assigned to the same ECS cache structure based on a common attribute such as SMS storage class. Alternately, each catalog may be assigned to a different ECS cache structure. The processor contains control information for catalogs being shared among host systems. The processor also allows for cross-notification between systems when changes occur to the catalog control information. Thereafter, sharing information of data records for a catalog from the processor is read from the associated ECS cache structure to the appropriate host system when the appropriate host system needs access to the catalog. In so doing the host systems can continue to use ECS when an ECS cache structure is disconnected to perform maintenance on one or more of that structure's assigned catalogs. This results in a significant performance improvement over conventional ECS that assigns all catalogs to a single ECS cache structure, and thus must default to VVDS sharing for all catalogs when any catalog requires maintenance. In this embodiment the processor 19 that stores the data record is the coupling facility 18. It should be understood that the processor could be in another area of the multiprocessor system, the key feature being that the Systems 10 can access the processor directly.

When utilizing the system of FIG. 1, the present invention allows for the storage of the entire data VVR for an ECS-active catalog, in the coupling facility processor 19. The VVR is accessed using the components of the host systems 10. When an ECS-active catalog is to be accessed by one of the Systems 10 the sharing information is read in from the coupling facility instead of DASD. If the shared catalog request involves an update to the ECS-active catalog, the VVR in the coupling facility 18 is updated; no writes are performed to the DASD subsystem for updates to the sharing subcell. This results in a significant performance improvement, with shared catalog performance approaching that of unshared catalogs.

Figure 2:
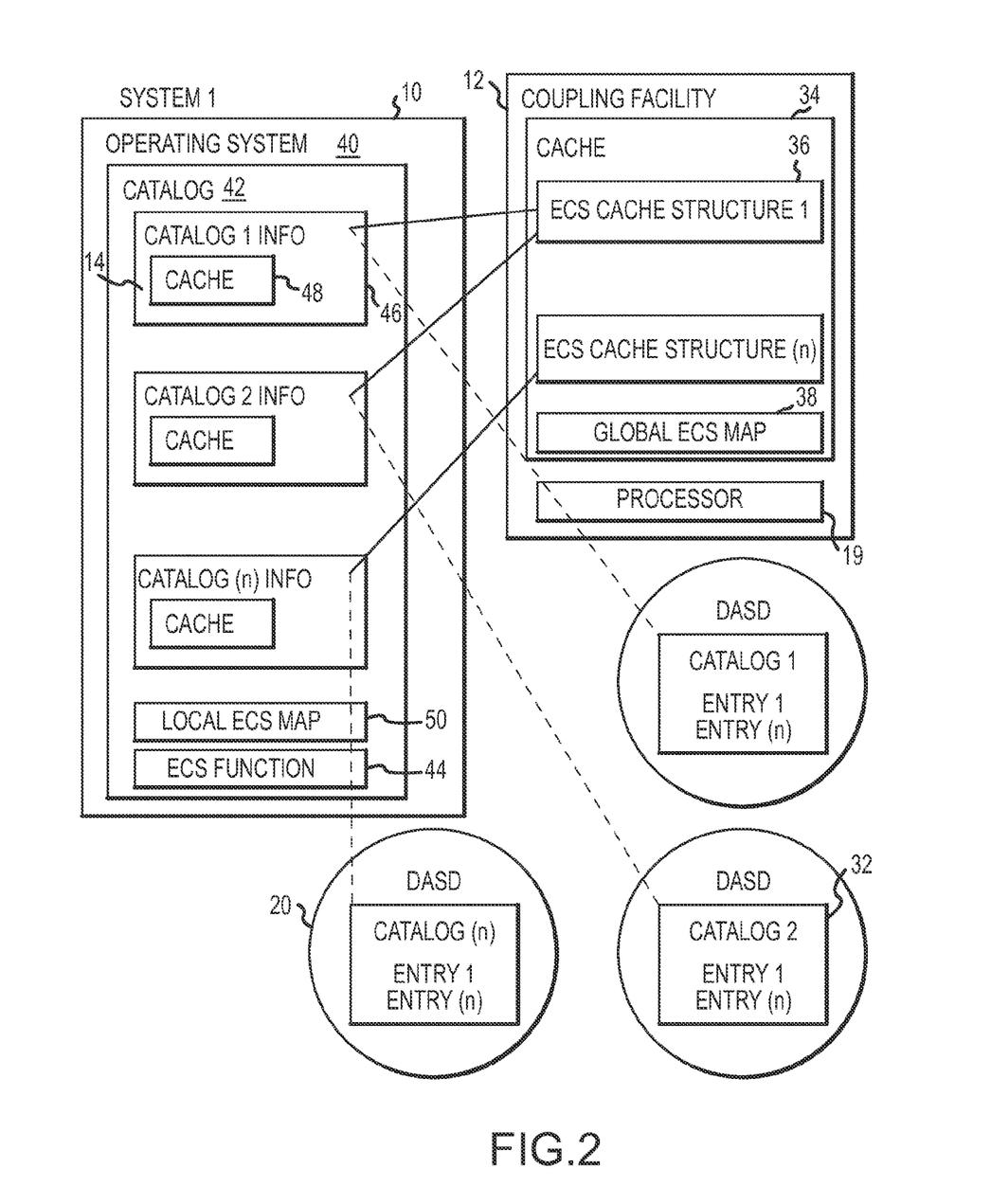
FIG. 2 illustrates the multiple ECS cache structure for sharing catalogs among the multiple data processing systems.

To more fully understand the operation of the multiple ECS for sharing catalogs among the multiple data processing systems, refer now to FIG. 2.

An entire data volume record 30 for each ECS-shared catalog 32 is stored in DASD 20. Data volume record 30 includes catalog updates.

Coupling Facility 12 includes processor 19 and cache 34 that is reserved for ECS. The Coupling Facility contains hardware similar to a host system. In fact a host system may be designated as the Coupling Facility. A plurality of ECS cache structures 36 are configured in cache 34. A global ECS map 38 is stored in cache 34. Global ECS map 38 maps at least one of the ECS-shared catalogs 32 to one and only one ECS cache structure 36. A copy of the entire data volume record 30 for each of the ECS-shared catalogs is stored in an associated ECS cache structure 36 according to the global ECS map. The architecture of the global ECS map may be determined by a common attribute of the ECS-shared catalog such as SMS storage class or a HLQ. For example, the map may include catalog entries according to SMS storage classes of R&D, test, production 1 and production 2. Alternately, the global ECS map may represent a 1-to-1 mapping of each ECS-shared catalog to a different ECS cache structure in which the attribute is the unique catalog name.

Host systems 10 include an operating system 40 such as z/OS that runs on each system. Operating system 40 has a Catalog component 42 that includes an ECS function 44. Catalog component 42 stores catalog information 46 in local cache 48 for data sets that are stored in local cache. The host system's ECS function connects its catalogs to one or more ECS cache structures in the coupling facility in accordance with the global ECS map. Taken together, the host systems' ECS functions connect multiple catalogs to multiple ECS cache structures in accordance with the global ECS map.

Each host system suitably creates and stores a local ECS map 50 in local cache. Local ECS map 50 represents a portion of the global ECS map 38 and maps at least one of the ECS-shared catalogs 32 in use by that particular host to one and only one ECS cache structure 36. The local ECS map is suitably provided so that the host system does not have to query the global ECS map in the coupling facility to read catalog updates from the data volume record in the coupling facility.

During normal operations, when a host system needs access to a catalog to verify the currency of the locally cached records for that catalog, the host uses its local ECS map to read the catalog updates directly from the data volume record in the associated ECS cache structure in the coupling facility. The coupling facility and host systems are disconnected from the plurality of DASD subsystems for catalog updates as long as the host systems' ECS functions are connected to ECS cache structures to which the catalogs are assigned. The hosts systems remain connected to the DASD for read and write operations.

During maintenance operations on a particular catalog, the host systems ECS functions are disconnected from only the ECS cache structure that stores the data volume record of the particular catalog. The coupling facility updates the data volume records stored in DASD for the affected catalogs. Prior to disconnecting, catalogs not involved in or affected by the maintenance may be moved from that ECS cache structure to another ECS cache structure either temporarily or permanently. While disconnected, the systems flush local cache and default to using VVDS sharing to read catalog updates for only those catalogs still associated with the ECS cache structure directly from DASD. The systems continue to use ECS for all other ECS-shared catalogs associated with different ECS cache structures. Once maintenance is complete, the ECS functions are reconnected to rebuild the ECS cache structure for at least the particular catalog. Any catalogs that were moved to another ECS cache structure may be moved back.

Figure 3:
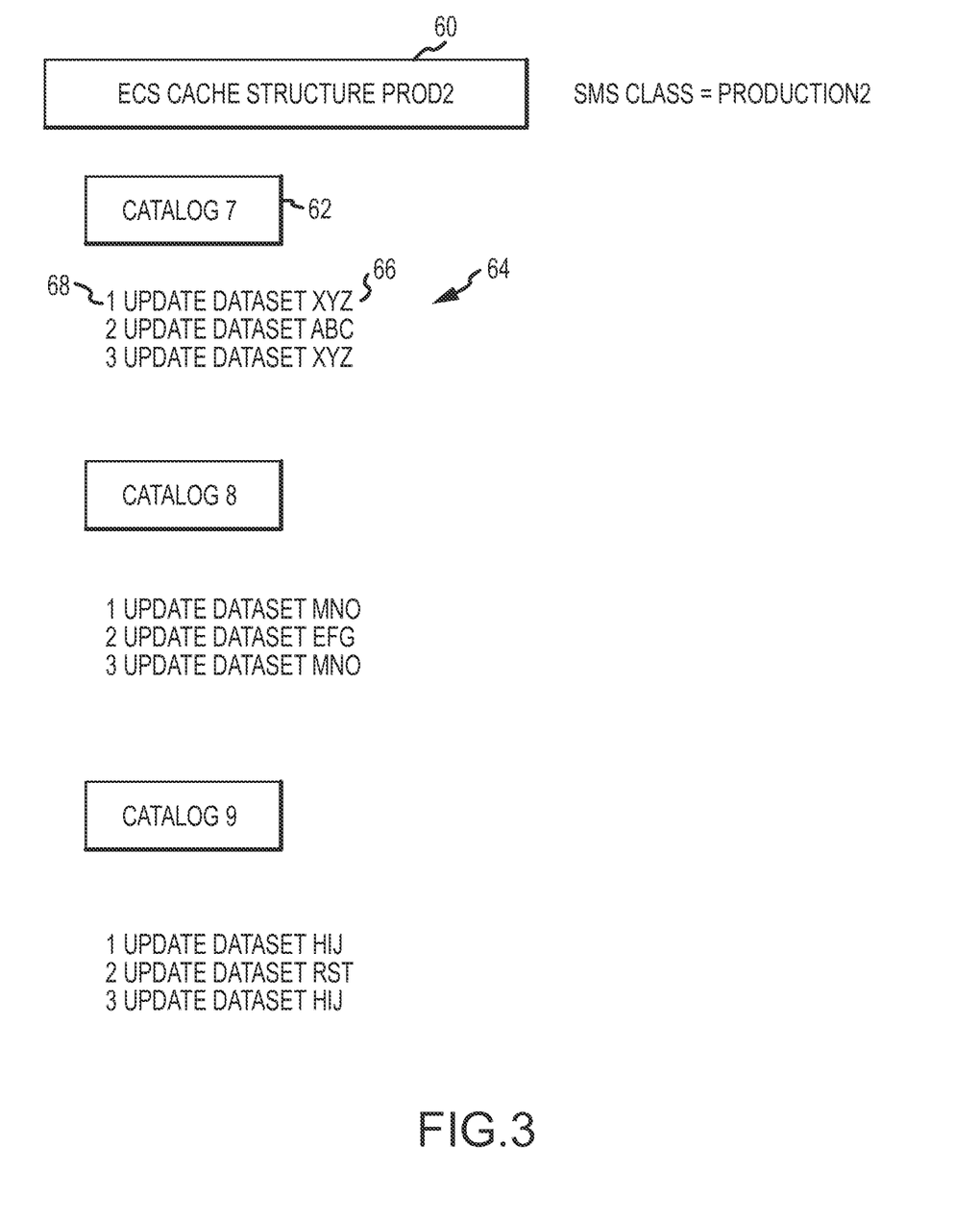
FIG. 3 illustrates an embodiment of data volume records stored in an ECS cache structure for different catalogs.

FIG. 3 illustrates an embodiment of an ECS cache structure 3 60. This ECS cache structure is designated as SMS class Production 2. Accordingly, the ECS functions for the host systems are connected to ECS cache structure 3 for the catalogs 62 having SMS class of Production 2 e.g. Catalogs 7, 8 and 9. A copy of an entire data volume 64 is stored in the cache structure for each catalog. Each data volume record in the coupling facility is updated with the catalog updates responsive to a shared catalog request from one of the host systems if the shared catalog request involves a catalog update 66 (e.g. one of the host systems has written to a data set). Each catalog update is associated with an increment counter 68. When a host system reads catalog updates from the data volume record, the host system can determine which data sets have been updated since the last time the host system read the catalog updates. This tells the host system which data sets need to be flushed from local cache and read from DASD as required. Typically each record includes 90 entries representing the last 90 changes to the catalog.

Figure 4A:
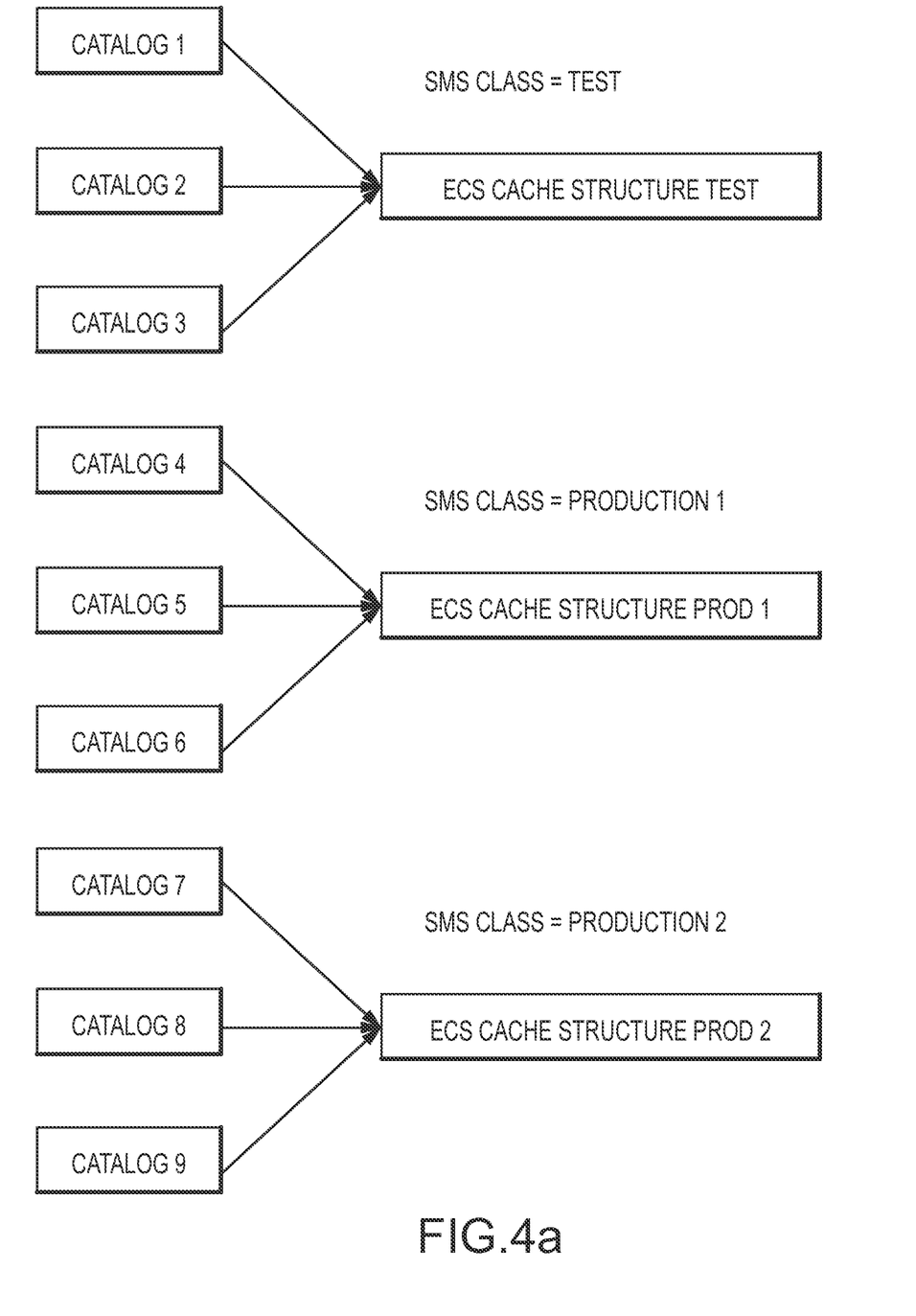
FIGS. 4a and 4b illustrate different approaches for assigning catalogs to the multiple ECS cache structures.

Referring now to FIGS. 4a and 4b, the ECS functions are connected and the catalogs are assigned to a particular ECS cache structure based on a common attribute. As shown in FIG. 4a, the common attribute is the SMS storage class associated with catalog. Catalogs 1-3 have an SMS class of "test" and are all assigned to ECS cache structure 1, catalogs 4-6 have an SMS Class of "Production 1" and are all assigned to ECS cache structure 2 and catalogs 7-9 have an SMS Class of "Production 2" and are all assigned to ECS cache structure 3. Each ECS-shared catalog is assigned to one and only one ECS cache structure. Each ECS cache structure may have one or more assigned catalogs, and may, at least temporarily, have no assigned catalogs.

In another embodiment, the common attribute might be a High Level Qualifier (HLQ) such as the first qualifier in a data set name. For example "SYS1" might be the HLQ of a data set have a name SYS1.PRODUCTION.UCAT.n. All catalogs having the same HLQ may be mapped to the same ECS cache structure. Alternately, all catalogs having an HLQ that starts with a letter from A-M may be mapped to one ECS cache structure and all catalogs having an HLQ that starts with a letter from N-Z may be mapped to another ECS cache structure.

Figure 4B:
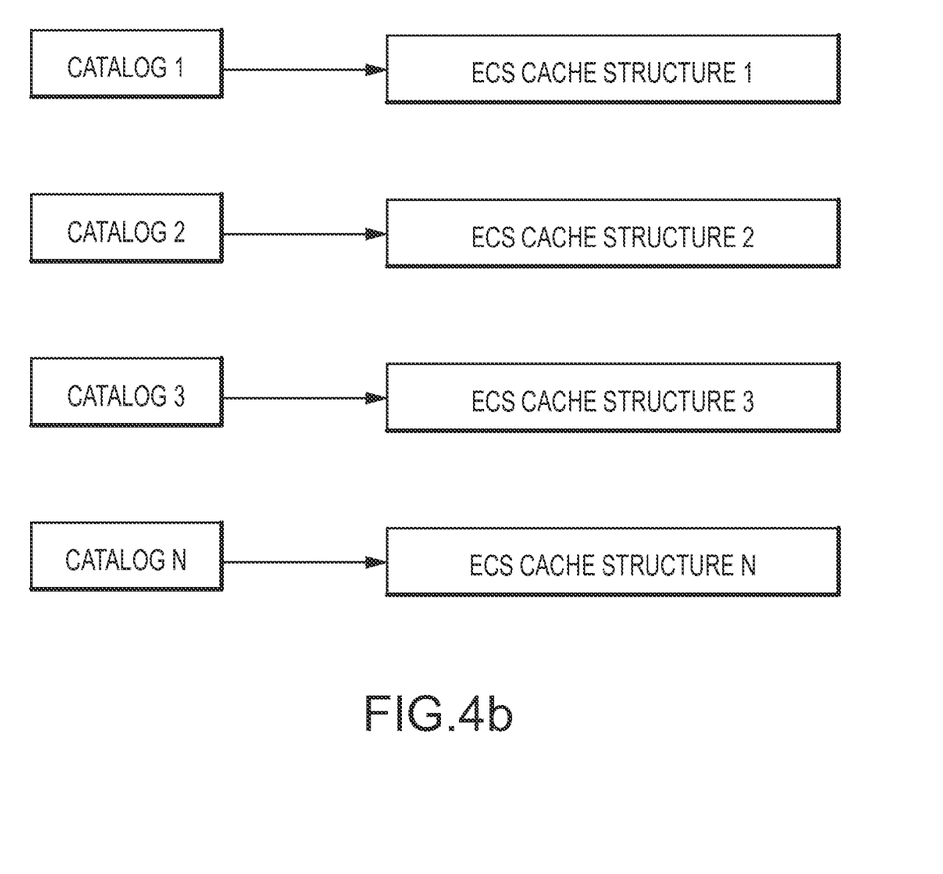

Another approach as illustrated in FIG. 4b is to use the name of the catalog as the common attribute and map each catalog to its own ECS cache structure. The advantage of this approach is that during maintenance on a particular catalog the ECS functions are only disconnected for that particular catalog. There is no requirement to move any catalogs to continue ECS for those catalogs. The systems only default to VVDS for that particular catalog. The potential disadvantage of this approach is that the host systems may have to manage a larger number of ECS cache structures.

In either case, the connection of the ECS functions and assignment of the catalogs to particular ECS cache structures can be done a priori based on knowledge of attribute mapping or as each catalog is opened for the first time by one of the host systems to build the global and local ECS maps.

Figure 5A:
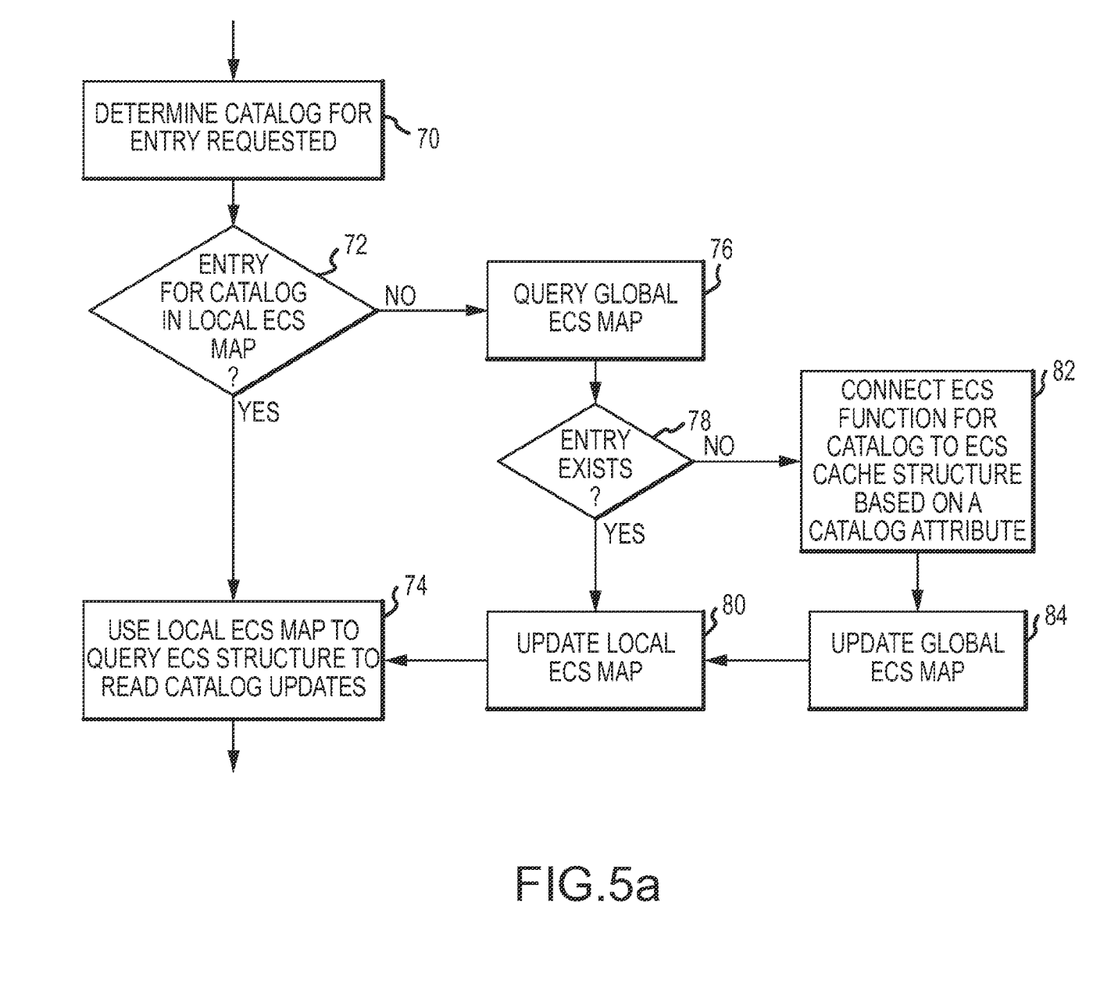
FIGS. 5a and 5b illustrates a flow diagram for connecting ECS functions to a plurality of ECS cache structures to assign one or more catalogs to the different ECS cache structures and for reading catalog updates from the assigned ECS cache structure.
Figure 5B:
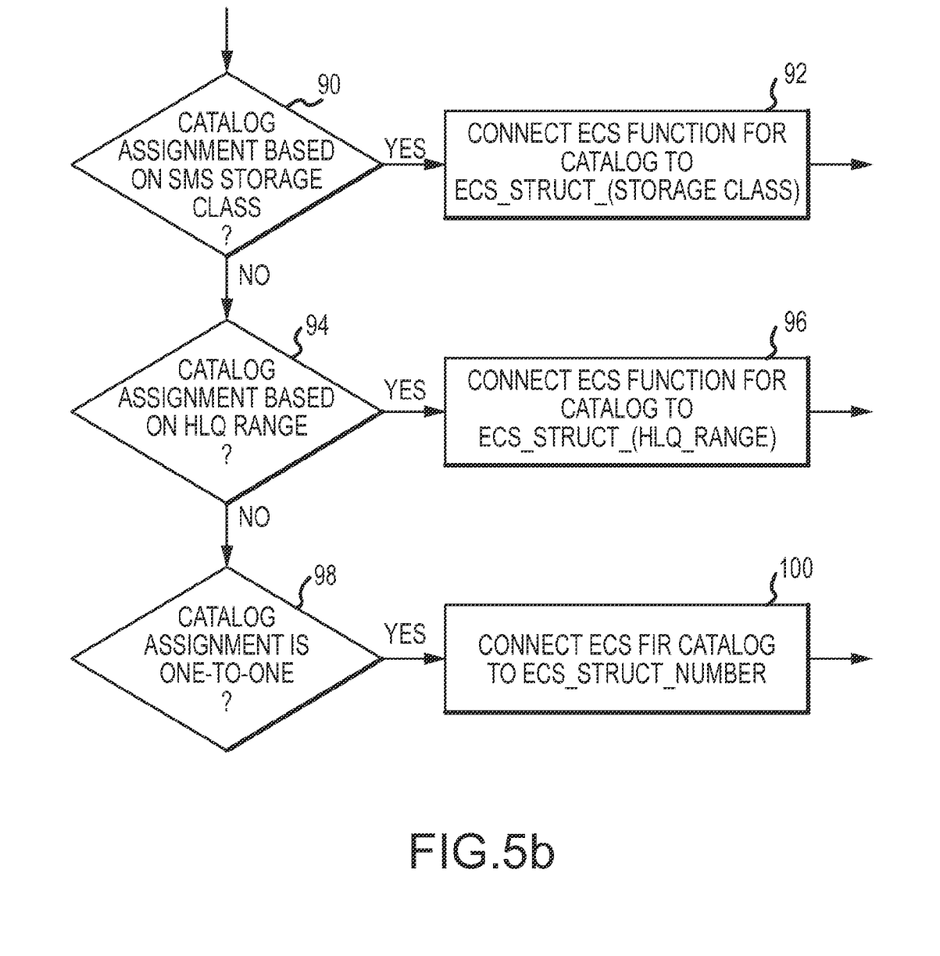

FIGS. 5a and 5b illustrates an embodiment for connecting ECS functions to and assigning catalogs to ECS cache structures as each catalog is opened for the first time by one of the host systems to build the global and local ECS maps and to read catalog updates. Upon receipt of an entry request for a particular data set, the Catalog component determines the catalog for requested entry (step 70). Catalog must then determine the correct ECS cache structure to query for the catalog. Catalog first determines if there is an entry for the catalog in the host system's local ECS map (step 72). If an entry exists, Catalog uses the local ECS map to query the indicated ECS cache structure to read the catalog updates (step 74). If an entry does not exist, Catalog queries the global ECS map in the coupling facility (step 76). Another one of the host systems may have previously opened the same catalog to create the entry in the global ECS map. If an entry exists (step 78), the Component updates its local ECS map (step 80) and proceeds to step 74 to read the catalog updates. If an entry does not exist, the Component connects its ECS function for the catalog to an ECS cache structure based on the catalog attribute (step 82), updates the global ECS map (step 84), updates its local ECS map (step 80) and proceeds to step 74 to read the catalog updates.

As illustrated in FIG. 5b, the Component may connect its ECS function for the catalog to an ECS cache structure based on the catalog attribute in a number of different ways as determined by the user. If the catalog assignment is based on SMS storage class (step 90), the Component determines the "storage class" of the catalog based on an assigned attribute and connects its ECS function to ECS_Struct_(storage class) (step 92). The catalog may or may not be the first catalog assigned to this particular ECS cache structure. If the catalog assignment is based on a HLQ (step 94), the Component determines the "HLQ range" of the catalog based on its HLQ and connects its ECS function to ECS_Struct_(HLQ range) (step 96). The catalog may or may not be the first catalog assigned to this particular ECS cache structure. If the catalog assignment is one-to-one (step 98), the Component connects its ECS function to ECS_Struct_number where "number" is the next number (step 100). In this case, the catalog is the first, last and only catalog assigned to this particular ECS cache structure.

Figure 6:
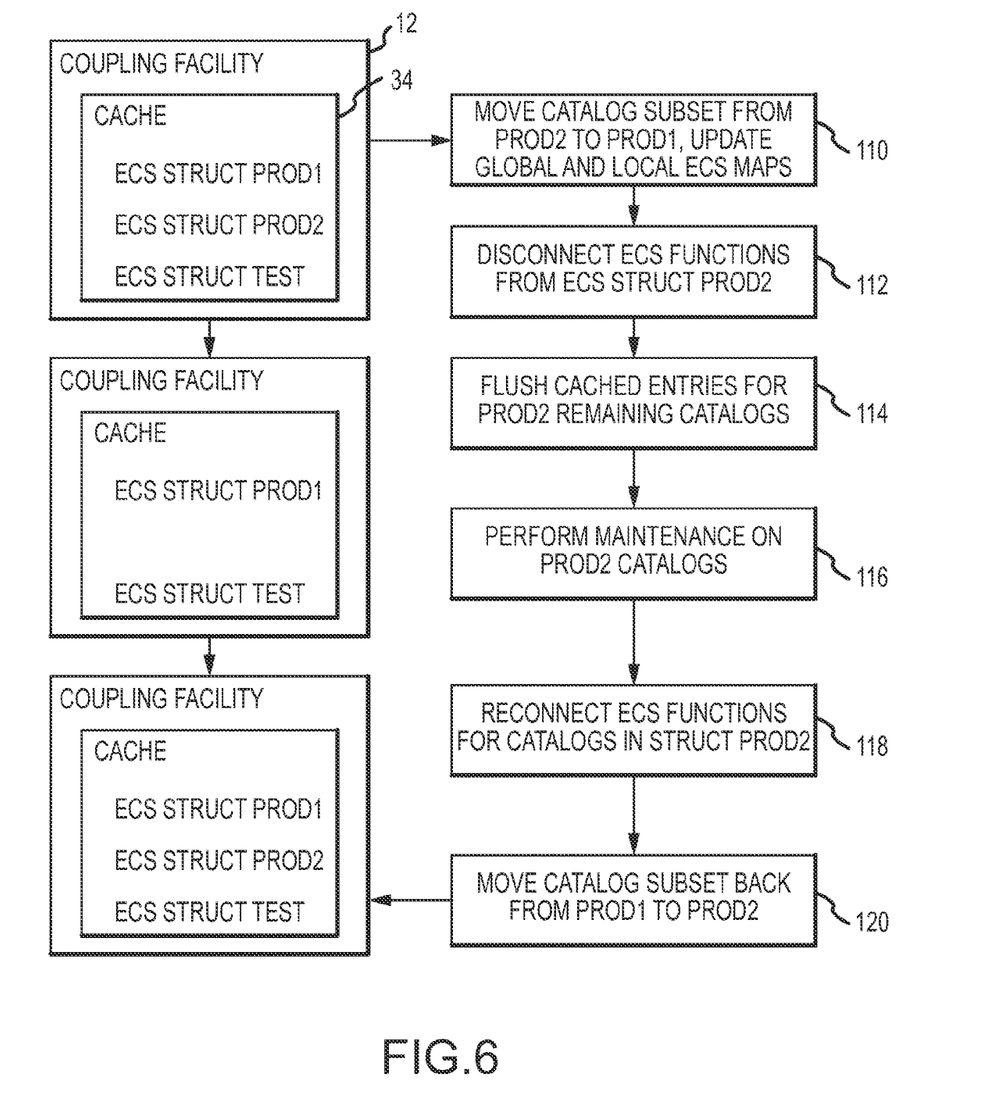
FIG. 6 illustrates a flow diagram for disconnecting ECS functions from an ECS cache structure to perform maintenance on a catalog assigned to that ECS cache structure and then reconnected the ECS functions to rebuild the ECS cache structure.

FIG. 6 illustrates an embodiment for performing maintenance on a particular catalog or subset of catalogs in in an ECS cache structure. In this example, the catalogs are assigned based on SMS storage class. ECS cache structures "Prod1", "Prod2" and "Test" exist in cache 34 in coupling facility 12. Catalogs 1-9 are assigned to the cache structures as shown in FIG. 3a. A copy of the entire data volume record for each catalog is stored in the assigned ECS cache structure in the coupling facility. For this example, assume maintenance needs to be performed on Catalog 8 in ECS cache structure Prod2 and that the maintenance affects Catalog 7 but not Catalog 9.

To perform maintenance on Catalog 8 in ECS cache structure Prod2 the ECS functions for all of the host systems must be disconnected from Prod2. Prior to disconnection, any other catalogs that are not affected by the maintenance may be moved, temporarily or permanently, to another ECS cache structure. For any catalogs that remain associated with the disconnected ECS cache structure, the host systems default to "VVDS sharing" to read catalog updates. For all other catalogs, the host systems continue to use ECS to read catalog updates, thereby minimizing I/O activity to DASD during maintenance operations.

In this example, a catalog subset including Catalog 9 is moved from ECS cache structure Prod2 to Prod1 (step 110). The global and local ECS maps are updated to reflect Catalog 9 assigned to ECS cache structure Prod1. The host systems Catalog components disconnect the ECS functions for Catalogs 7 and 8 from ECS Struct Prod2 (step 112). The host systems flush all local cache for Catalogs 7 and 8 (step 114). Once maintenance has been performed on Prod2 Catalogs 7 and 8 (step 116), the host systems Catalog components reconnect their ECS functions for Catalogs 7 and 8 in ECS cache structure Prod2 (step 118). If a subset of catalogs, e.g. Catalog 9, were moved out of ECS cache structure Prod2 prior to disconnection, the subset of catalogs may be moved back from Prod1 to Prod2 (step 120). If so, the global and local ECS maps are updated.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable other of ordinary skill in the art to understand the invention for various embodiments with various modifications as are suited to the particular use contemplated.

What is claimed is:

1. A method for sharing a plurality of catalogs of different data sets in a multiprocessor system, the multiprocessor system including a plurality of host systems that support an enhanced catalog sharing (ECS) function, a plurality of direct access storage device (DASD) subsystems and a coupling facility having cache structures reserved for ECS, the method comprising the steps of:
 (a) connecting the ECS function in the host systems to a plurality of ECS cache structures in the coupling facility;

(b) assigning at least one catalog to each said ECS cache structure and storing a copy of an entire data volume record of said at least one catalog in the ECS cache structure, wherein the catalog is shared by the plurality of host systems, wherein the data volume record includes catalog updates, wherein the data volume record in the coupling facility is updated with the catalog updates responsive to a shared catalog request from a first host system if the shared catalog request involves a catalog update;

(c) reading the catalog updates directly from the data volume record in the coupling facility to a first host system of the plurality of host systems when the first host system needs access to the catalog; and (d) to perform maintenance on a particular catalog, disconnecting the ECS functions for the host systems from only the ECS cache structure that stores the data volume record of the particular catalog, and, after maintenance is performed on the particular catalog, reconnecting the ECS functions to rebuild the ECS cache structure.

2. The method of claim 1, wherein each said catalog has a catalog attribute and wherein the plurality of ECS cache structures are associated with different catalog attributes, wherein the step of assigning at least one catalog to each ECS cache structure comprises assigning catalogs to the ECS cache structures based on the catalog attribute.

3. The method of claim 2, wherein at least first and second catalogs having the same catalog attribute are assigned to the same ECS cache structure.

4. The method of claim 3, wherein the catalog attribute is a high level qualifier (HLQ) of the catalog data set.

5. The method of claim 3, wherein the catalog attribute is a System Managed Storage (SMS) storage class to which the catalog data set belongs.

6. The method of claim 3, wherein to perform maintenance on the first catalog, prior to disconnecting the ECS functions from the ECS cache structure, moving the entire data volume record for the second catalog to another ECS cache structure.

7. The method of claim 6, wherein the another ECS cache structure is a temporary ECS cache structure.

8. The method of claim 6, wherein after the ECS cache structure is rebuilt and the ECS functions are reconnected to the ECS cache structure, moving the entire data volume record for the second catalog back to the ECS cache structure.

9. The method of claim 6, wherein the data volume records for all catalogs not affected by the maintenance of the first catalog are moved to another ECS cache structure.

10. The method of claim 1, wherein each said catalog is assigned to a different ECS cache structure so that each said ECS cache structures stores one and only one data volume record for a single catalog.

11. The method of claim 1, wherein the host systems store data sets for catalogs in local cache, to perform maintenance on the particular catalog, said host systems flushing only the local cache that store data sets for catalogs remaining in the associated ECS cache structure.

12. The method of claim 1, wherein to perform maintenance on the particular catalog, said coupling facility updates the data volume records stored in the DASD subsystems only for catalogs remaining in the associated ECS cache structure, said host systems reading the catalog updates directly from the data volume record in the DASD subsystems only for those catalogs remaining in the associated ECS cache structure.

13. The method of claim 1, wherein the coupling facility and host systems are disconnected from the plurality of DASD subsystems for catalog updates as long as the host systems' ECS functions are connected to ECS cache structures to which the catalogs are assigned.

14. A system for sharing a plurality of catalogs of different data sets in a multiprocessor system, comprising:
a plurality of direct access storage device (DASD) subsystems;
a coupling facility having cache structures reserved for enhanced catalog sharing (ECS);
a plurality of host systems supporting an ECS function and having cache for storing data sets, said host systems' ECS functions connected to a plurality of ECS cache structures in the coupling facility, each said ECS cache structure storing a copy of an entire data volume record of at least one catalog assigned to that ECS cache structure, wherein the catalog is shared by the plurality of host systems, wherein the data volume record includes catalog updates, wherein the data volume record in the coupling facility is updated with the catalog updates responsive to a shared catalog request from a first host system if the shared catalog request involves a catalog update;
said coupling facility configured for reading the catalog updates directly from the data volume record in the ECS cache structure to a first host system of the plurality of host systems when the first host system needs access to the catalog; and
to perform maintenance on a particular catalog, said host systems configured for disconnecting their ECS functions from only the ECS cache structure that stores the data volume record of the particular catalog and, once maintenance on the particular catalog is completed, for reconnecting their ECS functions to rebuild the ECS cache structure.

15. The system of claim 14, wherein each said catalog has a catalog attribute, wherein the plurality of ECS cache structures are associated with different catalog attributes, and wherein the at least one catalogs are assigned to each ECS cache structure based on the catalog attribute.

16. The system of claim 15, wherein at least first and second catalogs having the same catalog attribute are assigned to the same ECS cache structure, wherein to perform maintenance on the first catalog, prior to disconnecting the ECS functions from the ECS cache structure, the entire data volume record for the second catalog is moved to another ECS cache structure.

17. The system of claim 16, wherein after the ECS cache structure is rebuilt and the ECS functions are reconnected to the ECS cache structure, the entire data volume record for the second catalog is moved back to the ECS cache structure.

18. The system of claim 14, wherein the host systems store data sets for catalogs in their local cache, to perform maintenance on the particular catalog, said host systems flushing only the local cache that store data sets for catalogs remaining in the associated ECS cache structure.

19. The system of claim 14, wherein to perform maintenance on the particular catalog, said coupling facility updates the data volume records stored in the DASD subsystems only for catalogs remaining in the associated ECS cache structure, said host systems reading the catalog updates directly from the data volume record in the DASD subsystems only for those catalogs remaining in the associated ECS cache structure.

20. The system of claim 14, wherein the coupling facility and host systems are disconnected from the plurality of DASD subsystems for catalog updates as long as the host systems' ECS functions are connected to ECS cache structures to which the catalogs are assigned.

\* \* \* \* \*